(12) United States Patent
Falgout, Sr.

(10) Patent No.: US 6,203,435 B1
(45) Date of Patent: Mar. 20, 2001

(54) DRILLING MOTOR COUPLER

(76) Inventor: Thomas E. Falgout, Sr., 110 Charles Read St., Lafayette, LA (US) 70503

( * ) Notice: Subject to any disclaimer, the term of this patent is extended or adjusted under 35 U.S.C. 154(b) by 0 days.

(21) Appl. No.: 09/326,341

(22) Filed: Jun. 4, 1999

(51) Int. Cl.[7] .................................................. F16D 17/02
(52) U.S. Cl. ................................ 464/18; 464/11; 464/12
(58) Field of Search ............................... 464/11, 18, 112, 464/157, 158, 159, 909

(56) References Cited

U.S. PATENT DOCUMENTS

| | | | |
|---|---|---|---|
| 2,471,665 | * 5/1949 | Williams | 464/112 |
| 3,733,853 | * 5/1973 | Sutliff et al. | 464/19 |
| 4,157,022 | * 6/1979 | Crase | 464/11 |
| 5,205,789 | 4/1993 | Falgout, sr. . | |
| 5,495,900 | * 3/1996 | Falgout, Sr. | 175/74 |
| 5,651,737 | 7/1997 | LeBlanc . | |
| 5,679,894 | * 10/1997 | Kruger et al. | 73/152.03 |

* cited by examiner

Primary Examiner—Anthony Knight
Assistant Examiner—Aaron Dunwoody
(74) Attorney, Agent, or Firm—John D. Jeter

(57) ABSTRACT

The coupler is a ball and socket arrangement with retaining, sealing and lubricating features, and torque transmitting elements to rotationally connect the ball and socket. The torque transmitting elements include cams secured to the ball and sliding, to allow flexure, in slots in the socket surface. The retainer, which limits axial separation of ball and socket, preferably, also has a convex spherical surface with an origin common to that of the ball to provide a sealing surface to retain lubricant in the ball and socket region. A spring biased seal carrier has seals to engage the retainer convex surface and the element carrying the ball to form a closure. In an alternate form, the sealing elements comprise a tubular elastomer element attached at each end to the opposite terminals of the coupler.

14 Claims, 2 Drawing Sheets

DRILLING MOTOR COUPLER

BACKGROUND

Drilling motors have evolved into two main types for use down hole in the well drilling industry. The prevailing types are turbodrills and progressing cavity positive displacement motors. The progressive cavity motor is an apparatus in which a rotor with a spiral configuration rotates within a stator which has a bore section with one more radial cavity than the number of lobes on the rotor. The rotor rotates in one direction while its centerline progresses about a circular path in the opposite direction. The circular path may have a diameter only a fraction of the diameter of the rotor.

The drilling apparatus called a down hole motor is actually a motor, usually fluid powered, that is connected internally to an overall motor output shaft. The output shaft, common to most drilling motors, has to be especially ruggedized for well drilling. The output shaft, its housing and related bearings and seals, represent a composite machine that is driven by the motor and, in turn, drives a drilling head. Connecting the motor to the composite machine to form a reliable drilling apparatus comprises what has become known as a down hole motor. The motor connection to the output shaft has been a challenge, especially in the Moyno type apparatus.

Electric motors and turbodrills can be connected to the composite output machine directly unless the housing is bent to deflect the progressing well bore. Such motors can usually function with one flex unit whereas the moyno device usually requires two, axially separated, flex units.

Progressing cavity positive displacement motors usually have to be connected to the composite output machine by some form of flexing arrangement to allow the rotor centerline to traverse the circular path. When progressing cavity positive displacement drilling motors were first introduced they had two automotive type universal joints in the drive train between motor and output shaft. That arrangement had its limitations because available radial dimension did not allow large universal joints to be used, and the flex joints were often overloaded with a resultant short life.

To cope with the need for more torque to be carried by the flexing shaft, various alternatives have been tried with varied results. U.S. Pat. No. 5,205,789 issued Apr. 27, 1993 was successful but hard to continually lubricate. It also had highly stressed contact areas. High torque loads and long bit runs reduced the reliability of that design.

To assure lubrication of the flexing joints, rubber sleeves were used with mixed results. As long as they remained intact, they worked but the highly stressed contact points were still a life limiting factor. The rubber sleeves also were subject to occasional puncture which brought on early failure. Because tripping a drill string to change the down hole assembly is so costly, drilling motors need to be very reliable. Eliminating the rubber sleeve and the high stress contact points is a practical approach to improvement.

It is therefore an object of this invention to provide flexible couplers that have lubricant confined by rigid shell structures.

It is also an object of this invention to provide machine elements that eliminate the highly stressed contact areas where torque is conveyed between cooperating flex members by sliding contact.

These and other objects, advantages, and features of this invention will be apparent to those skilled in the art from a consideration of this specification, including the attached claims and appended drawings.

SUMMARY OF INVENTION

The coupler is a ball and socket arrangement through which thrust in both axial directions is transferred, with torque transmitted by a key and slot arrangement. The keys, definable as rocker cams, are mounted on the sides of the ball and work in cooperating grooves along the inside surface of the socket. The rocker cams are, preferably, carried on pins bearingly supported in holes in the ball with the axes on a ball radius. The grooves are long enough for the cams to move therein to allow a total flexure, usually about twelve degrees, about an axis that is transverse the axes of the cam pins. In any fixed rotational position then the ball can tilt about selected transverse axes that pass through the center of the ball. Tilt about one axis is permitted by rotation of the pins in their bearings. Tilt about the transverse axis is permitted by peripheral movement of the cam heads along the grooves. The cams have heads with preferred flat sliding surfaces to increase the contact area and reduce unit stress. Non-planar rubbing surfaces that mate with the rubbed surface of the slots will distribute load and they are anticipated by the claims, but they are harder to produce and assemble.

Torque is transmitted to, or from, the ball by a load carrier shaft, or extension, that is attached to or is part of the ball structure. The load carrier shaft is driven by one of the connector terminals. The socket is part of the other terminal.

The coupler normally carries compressive loads only. Occasional tension loads are relatively light and the coupler is constrained axially by slots that are windows that allow only limited movement of the cams, or by a tension load retainer on one terminal that can engage an abutment on the other terminal.

Lubricant is, preferably, contained by a variable volume reservoir that is about pressure balanced concerning hydrostatic head. The reservoir is charged before or during assembly. The lubricant filled enclosure is sealed, preferably, by seal carrier elements that are rigid and spring biased against spherical surfaces. Optionally, a bellows, with ends secured to opposite terminals of the coupling, can be used to retain lubricant in some cases.

BRIEF DESCRIPTION OF DRAWINGS

In the drawings wherein like features have similar captions.

DETAILED DESCRIPTION OF DRAWINGS

Figure 1:
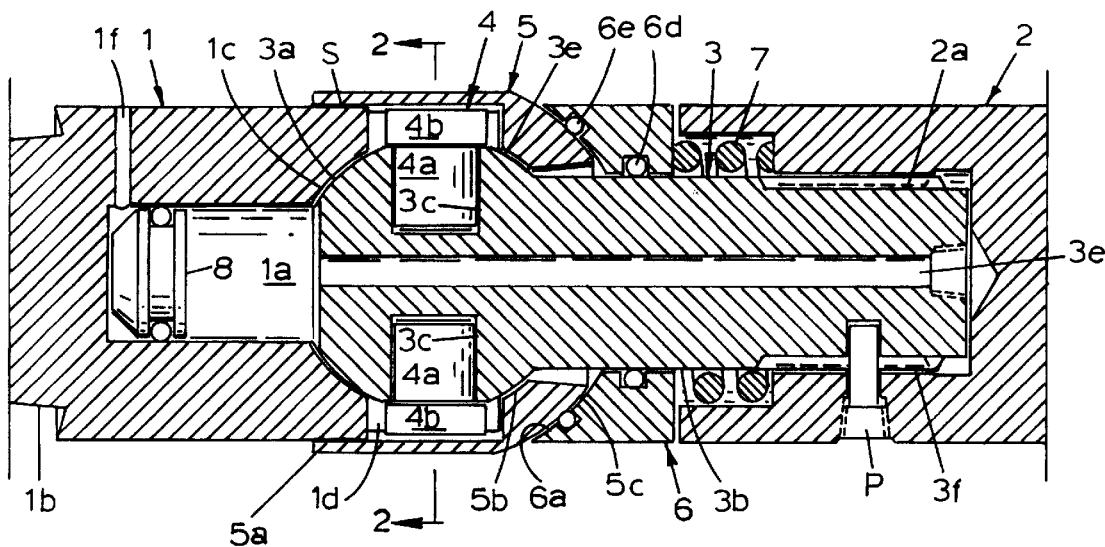
FIG. 1 is a side view, mostly cut away, of the preferred embodiment.

In the drawings features that are well established in the art and do not bear upon points of novelty are omitted in the interest of descriptive clarity. Such omitted features may include threaded junctures weld lines sealing elements pins and brazed junctures. Mating surfaces that function as seals are captioned S.

In the drawings, FIG. 1 is a side view of an alternate assembly of the apparatus. First terminal 1 has means 1b (only partially shown) for connection to the continuing drive shaft. Second terminal 2 is either part of or is attached, by means not shown, to the continuing drive shaft. Threaded bore 2a accepts the mating threads of the load carrier extension 3b which carries the ball 3a of load carrier 3. Rotational effort is conveyed to or from terminal 1, slots 1d, to rocker cams 4, to rocker pins 4a in bores 3c, to (or from) terminal 2. Optional pin P prevents loosening of the mating threads 2a and 3f.

Lubricant is installed in reservoir 1a by way of passage 3e and moves plug 8 to the travel limit, in bore 1a, as shown. Pressure reference passage If delivers hydrostatic pressure to the top of the piston. In drilling use, drilling fluid flows from left to right along the outside of the coupler, inside a confining annulus, and a dynamic pressure difference exists between passage If and anything further right on the drawing. The two seals 6d and 6e, on seal carrier 6, are exposed to a positive inside pressure induced by the mud flow. Those two seals are the only outlet for lubricant loss.

Tension load retainer 5 has shroud 5a which is a press fit on the peripheral surface of terminal 1. That press fit is a fluid tight association and is captioned S.

On occasions, the motor rotor of the apparatus is thrust upward, or to the left on the drawing. That thrust places the assembly in tension. The ball surface 3a should be retained against socket surface 1c and retainer 5 has surface 5b to engage the lower surface 3e of the ball for constraint.

It is desirable to flood all thrust loaded surfaces with lubricant, that precludes sealing on the thrust loaded surfaces and the retainer has spherical surface 5c with the same center as the ball for the sealing purpose. Surface 6a mates surface 5c and carries seal 6e. Seal carrier 6 carries a seal 6d against the outer surface of extension 3b. Spring 7 pushes the seal carrier 6 against spherical surface 5c to accomplish seal loading to retain lubricant.

Rocker cams 4 have pins 4a in bores 3c for rotation therein to allow cam heads 4b to ride in slots 1d to allow the terminals to deflect about the center of the ball. A deflection of only about six degrees, in each direction, is usually required for normal motor operation. Clearances for six degrees of misalignment is shown between cooperating members. The cams can be secured in place by shroud 5a. Alternatively a shoulder screw can be used, coaxial with the pins 4a, with threads tapped into the bottom of bores 3c (not shown).

In the usual use situation a shaft between a progressing cavity motor and the output shaft of a drilling motor will have two identical flex units such as that of FIG. 1. The configuration shown is for the upper coupling. The lower coupling is identical with the exception of the end treatment, which will be reversed. The shape 1b, then, will be at the lower end of terminal 2. The couplings are designed to fit different motors and the end treatment is adapted to the intended purpose.

Figure 2:
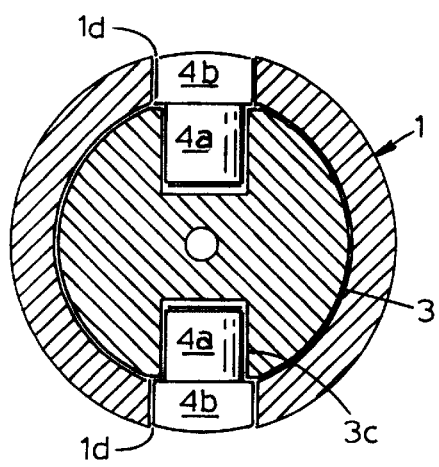
FIG. 2 is a sectional view, slightly enlarged, taken along line 2—2 of FIG. 1 with only the torque carrying elements shown for clarity.

FIG. 2, taken along line 2—2 of FIG. 1, shows a two drive cam arrangement. More peripherally distributed drive cams may be used, depending upon the size, and other considerations, of the assembly. Cams 4 have rectangular heads 4b to slideably ride in slots 1d.

Figure 3:
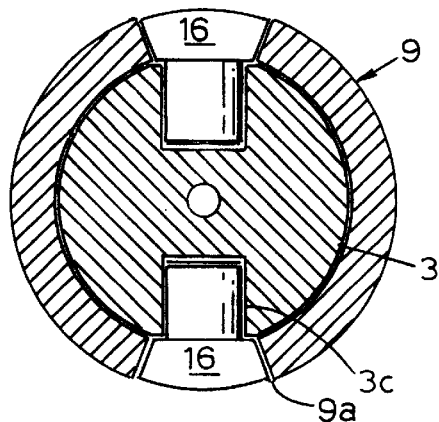
FIG. 3 is identical to FIG. 2 excepting the rocker pins which reflect an alternate configuration.

FIG. 3 represents an alternate configuration of the cams and slots. Here terminal 9, similar to terminal 1, has divergent slots 9a and mating sliding surfaces on the drive cams 16.

Figure 4:
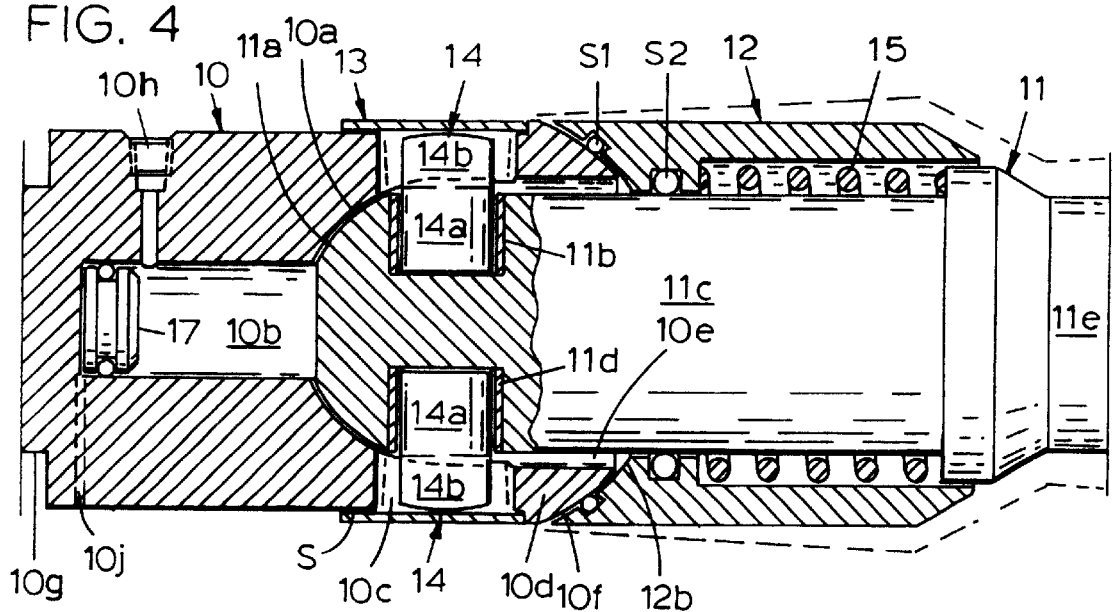
FIG. 4 is a side view, mostly cut away, of the preferred embodiment of the invention.

FIG. 4 is a side view of the preferred embodiment. In this configuration drive cams 14 are installed through, and slidingly operate in, windows 10c in terminal 10. Terminal 11 has spherical surface 11a, mating surface 10a on load carrier extension 11c which has bores 11b with inserts 11d which bearingly carry the pins 14a of cams 14. Pins 14a may oscillate rotationally about twelve degrees. Cam heads 14b have square shapes for sliding in windows 10c. Bore 10e permits extension 11c to deflect. Spherical surface 10f is on extension 10d of terminal 10 and mates with spherical surface 12b on seal carrier 12. Seal S1 retains lubricant, along with seal S2 which engages extension 11c. Shroud 13 is press fitted, and fluid tight, on terminal 10 and retains cams 14. Spring 15 provides thrust between terminal 11 and surface 10f. Lubricant is loaded through port 10h. Piston 17 has pressure reference port 10j and moves in bore 10b to provide a lubricant volume for the assembly. Attachments 10g and 11e are symbolic of means to attach the assembly to the continuing drive shaft. These connections are of whatever configuration that serves the purpose of the drilling motor arrangement in use. For progressing cavity type motors, and bent body motors, there are commonly two such assemblies spaced some distance apart. One of the terminals will usually be part of the shaft connecting the two flexing units involved. Dashed lines show the general envelope of the range of flexing of the assembly in use.

Figure 5:
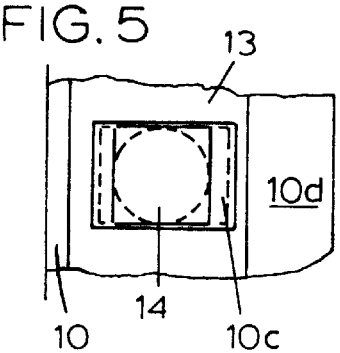
FIG. 5 is a fragmented view of a particular portion of the apparatus of FIG. 4.

FIG. 5 is a view along the axis of cam pin 14a. The square cam 14b is shown in window 10c. If tension through the assembly exists, the pins in the windows secures the assembly against separation. The window is also a slot.

Figure 6:
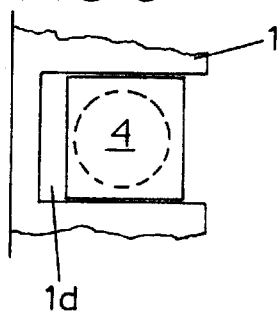
FIG. 6 is a fragmented view of a particular portion of the apparatus of FIG. 1.

FIG. 6 is a view along the axis of cam pin 4a of FIG. 1 and shows the slot 1d as contrast to the window 10c.

Figure 7:
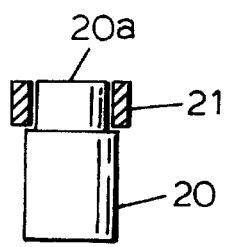
FIG. 7 is a side view of an alternate form of an assembly to replace one element of the apparatus of FIGS. 1 and 4.

FIG. 7 represents a drive cam and pin of alternate configuration. For this option, the pin is pressed into the receiving bore, as contrast to the bearing fit previously described, and the square cam element 21 is bearingly supported on the pin end 20a on pin 20. The cam element 21 oscillates laterally in the window or slot and rotationally oscillates about the pin to place the bearing surfaces in close proximity.

Figure 8:
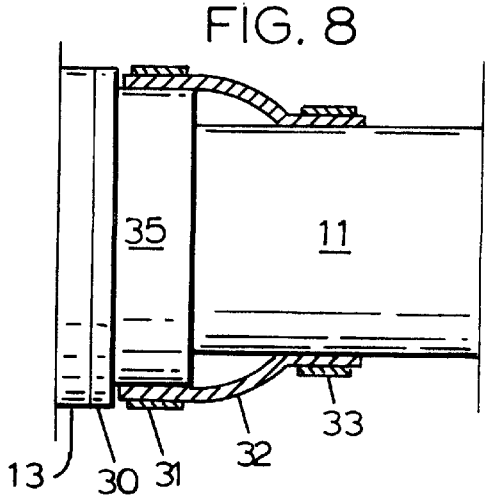
FIG. 8 is a side view, mostly cut away and somewhat reduced in scale, showing an alternate closure arrangement.

FIG. 8 represents an alternate closure arrangement, shown as it would relate to FIG. 4. Elements 11 and 13 are unchanged. Elements 12, 15, S1 and S2 are eliminated. Extension 10d, now captioned 35, is modified to provide attachment means for bellows 32. Component 30 is otherwise similar to terminal 10. Bands 31 and 33 secure and seal the ends of the bellows.

From the foregoing, it will be seen that this invention is one well adapted to attain all of the ends and objects hereinabove set forth, together with other advantages which are obvious and which are inherent to the coupling.

It will be understood that certain features and sub-combinations are of utility and may be employed without reference to other features and sub-combinations. This is contemplated by and is within the scope of the claims.

As many possible embodiments may be made of the coupler of this invention without departing from the scope thereof, it is to be understood that all matter herein set forth or shown in the accompanying drawings is to be interpreted as illustrative and not in a limiting sense.

What is claimed is:

1. A down hole drilling motor drive shaft flexible coupler for inclusion in a continuing motor drive shaft, the coupler comprising:

a) a first terminal with means for attachment to a continuing motor drive shaft and a first spherical surface with a plurality of peripheral slots extending some distance thereabout in a generally axial direction;

b) a second terminal with means for attachment to a continuing motor drive shaft;

c) a load carrier with a second spherical surface to mate with said first spherical surface and a generally cylindrical extension, with an axis, secured to said second terminal, said second spherical surface provided with at least two diametrically opposed cross bores each with axes that lie along a radial line of the sphere comprising said second spherical surface; and d) a rocker cam situated in each said cross bore, each with a head extending into one of said slots, each situated to rotate a limited amount in said bore, said heads situated to slide axially a limited amount along said slots.

2. The coupler of claim 1 wherein said rocker cam head has planar sides situated to rub the sides of said slot when said cam moves along said slot.

3. The coupler of claim 1 wherein a tension load retainer is secured to said first terminal and extends to engage an abutment on said second terminal to limit axial separation of said first and second terminals.

4. The coupler of claim 1 wherein a lubricant retaining closure is situated to retain lubricant between said first and said second terminals.

5. The coupler of claim 3 wherein said tension load retainer sealingly engages to close the opening between said first and said second terminals.

6. The coupler of claim 5 wherein said sealing means comprises an elastomer element arranged for attachment to said second terminal and said tension load retainer.

7. The coupler of claim 3 wherein said tension load retainer has a convex spherical surface with a point of origin coinciding with that of said second spherical surface and a seal carrier carried by said second terminal, spring biased against said convex spherical surface for sealing effect, with a fluid tight closure carried by said seal carrier to sealingly engage said second terminal.

8. A drilling motor drive shaft flexible coupler, with an axis of general symmetry, for inclusion in a continuing motor drive shaft, said coupler comprising:

a) a first terminal with means for attachment to a continuing motor drive shaft, with a first spherical surface having a plurality of peripheral slots extending some distance thereabout in a generally axial direction;

b) a second terminal with means for attachment to a continuing motor drive shaft;

c) a load carrier extension on said second terminal with a second spherical surface to mate with said first spherical surface, having at least two peripherally distributed cross bores, each with an axis that lies along a radial line of the sphere defined by said second spherical surface, each said bore opening on a side of said sphere;

d) a rocker cam head situated on a pin in each said cross bore, each head extending into one of said slots, each pin situated to rock in said bore and each head situated to slide along said slot; and e) a closure between said first and said second terminal to confine lubricant contained therein.

9. The coupler of claim 8 wherein said rocker cam head has sides situated to mate with and rub, with a preselected bearing surface, the sides of said slot when said cam head moves along said slot.

10. The coupler of claim 8 wherein said slots define a window in said first terminal to restrict axial movement of said rocker cam heads to limit axial separation of said first and second terminals.

11. The coupler of claim 8 wherein a lubricant retaining closure is situated to retain lubricant between said first and said second terminals.

12. The coupler of claim 11 wherein said closure comprises a convex spherical surface on said first terminal arranged to sealingly engage a convex spherical surface on a seal carrier sealingly situated on said second terminal.

13. The coupler of claim 11 wherein said lubricant retaining closure comprises a tubular elastomer element arranged for attachment to said first terminal and said second terminal.

14. The coupler of claim 12 wherein said seal carrier is spring biased to apply a resilient load against said convex spherical surface.

* * * * *